US006916064B2

(12) United States Patent
Böhm et al.

(10) Patent No.: US 6,916,064 B2
(45) Date of Patent: Jul. 12, 2005

(54) SLIDING ROOF SYSTEM FOR A MOTOR VEHICLE

(75) Inventors: Horst Böhm, Frankfurt (DE); Rainer Grimm, Frankfurt (DE); Manfred Röhnke, Rödermark (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 10/705,540

(22) Filed: Nov. 10, 2003

(65) Prior Publication Data

US 2005/0001457 A1 Jan. 6, 2005

(30) Foreign Application Priority Data

Nov. 15, 2002 (DE) ......................................... 102 53 401

(51) Int. Cl.⁷ ................................................. B60J 7/02
(52) U.S. Cl. .............................. 296/216.04; 296/216.08
(58) Field of Search ....................... 296/216.04, 216.08, 296/223

(56) References Cited

U.S. PATENT DOCUMENTS 4,995,667 A  *  2/1991  Tamura et al. ......... 296/216.03

5,673,515 A     10/1997  Weber et al.
2002/0060470 A1  5/2002  Schlecht et al.

FOREIGN PATENT DOCUMENTS

| DE | 2345995 | * | 4/1975 | ................. 296/223 |
| DE | 43 06 451 C1 | | 3/1994 | |
| DE | 100 02 457 C2 | | 8/2000 | |
| DE | 100 02 457 | | 8/2000 | |
| EP | 1 180 445 A1 | | 2/2002 | |

OTHER PUBLICATIONS

Search report, Austrian Patent Office, dated Jan. 21, 2003.
European Search Report, Mar. 9, 2004.

* cited by examiner

*Primary Examiner*—Dennis H. Pedder
(74) *Attorney, Agent, or Firm*—Carlson, Gaskey & Olds

(57) ABSTRACT

The present invention relates to a cover for a sliding roof system having at least two guide elements, which are movably arranged on two opposite sides of the cover such that the distance between them is variable. The two guide elements are each attached in a sliding guide, which predefines a displacement direction for the guide elements that differs from the displacement direction of the cover, such that the cover is centered with regard to the two guide elements. The invention also relates to a sliding roof system having two guide tracks, which extend along a roof of a motor vehicle at a changing distance, and a cover.

20 Claims, 4 Drawing Sheets

FIG. 5

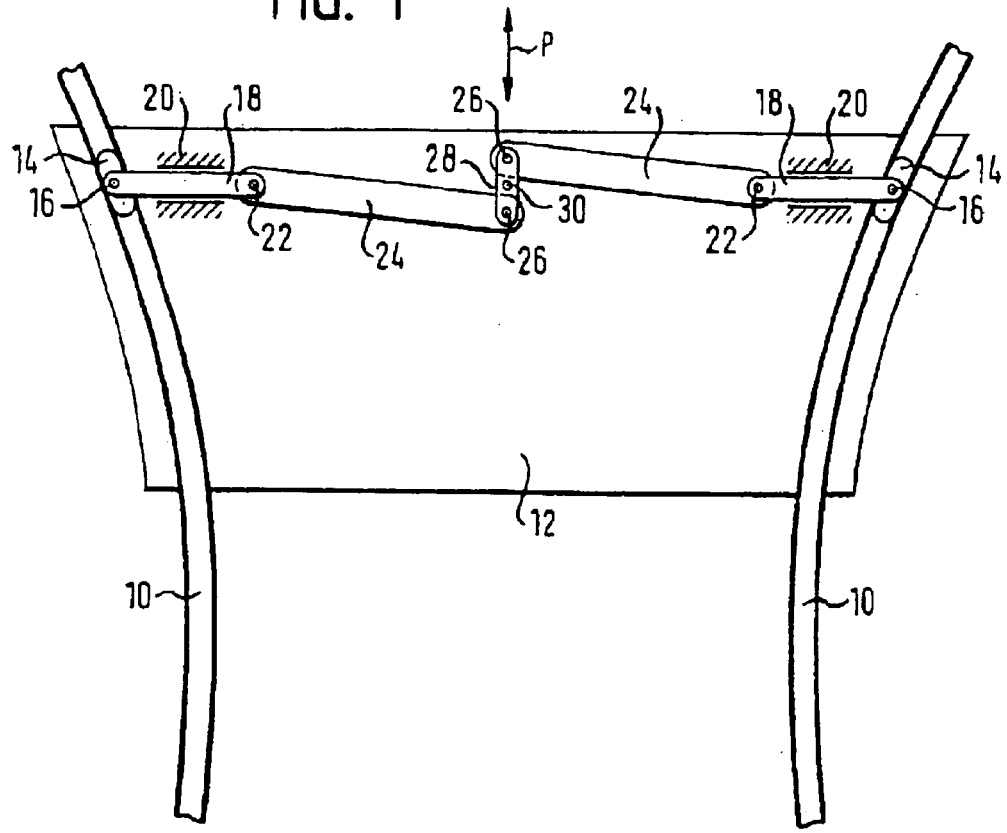
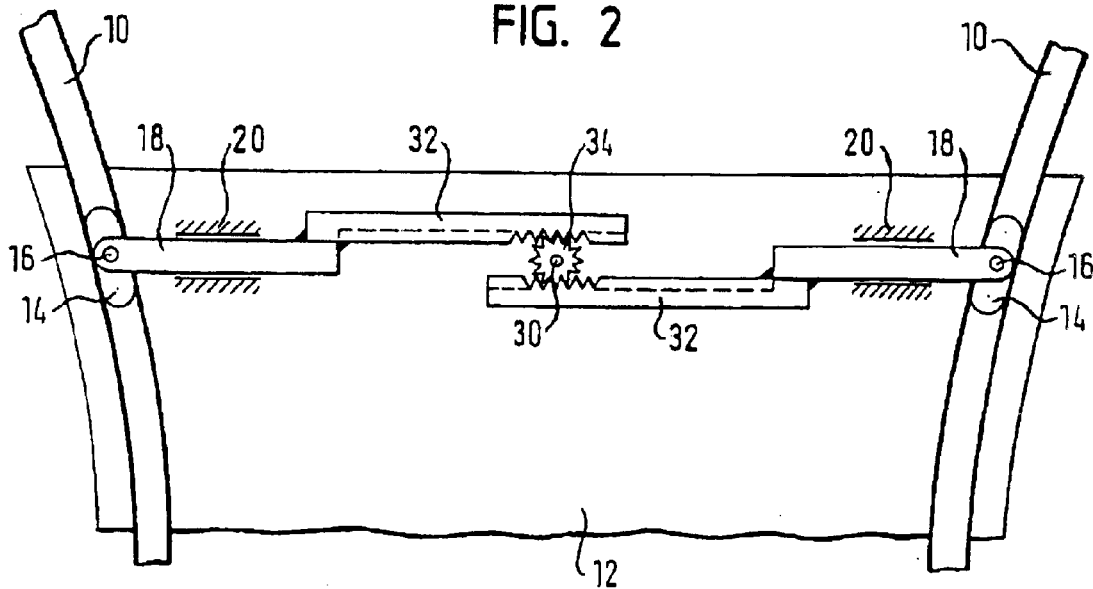

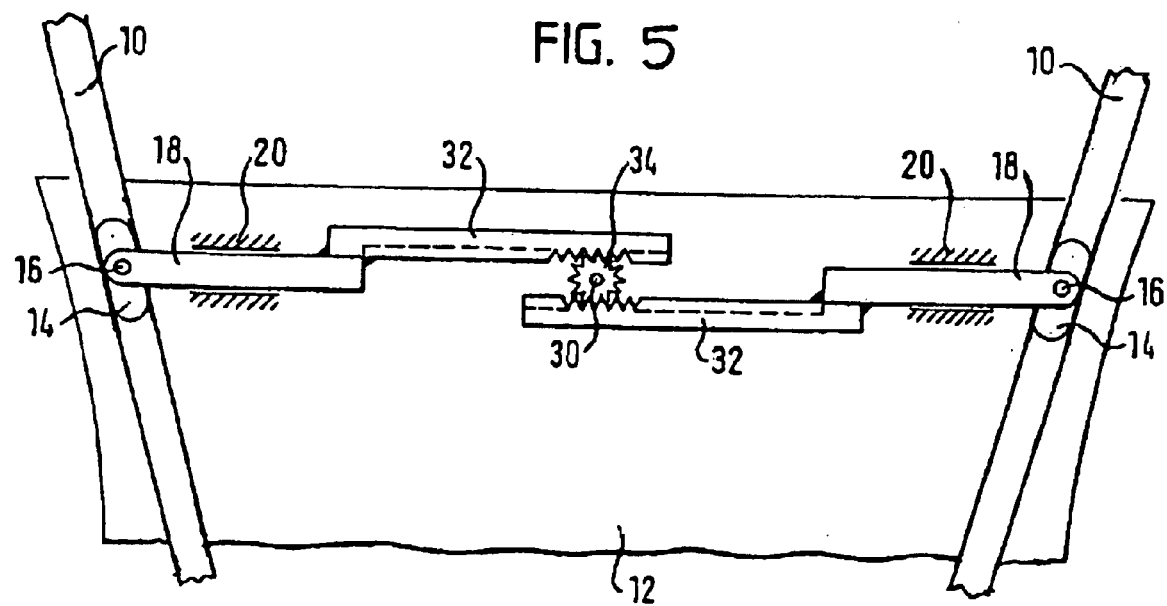

SLIDING ROOF SYSTEM FOR A MOTOR VEHICLE

REFERENCE TO RELATED APPLICATIONS

The present invention claims the benefit of German Patent Application No. 102 53 401.2, filed Nov. 15, 2002.

TECHNICAL FIELD

The present invention relates to a cover for a sliding roof system having at least two guide elements that are movably arranged on two opposite sides of the cover, such that the distance between them is variable. The present invention also relates to a sliding roof system having two guide tracks and to a cover of this type.

BACKGROUND OF THE INVENTION

German Laid-Open Document DE 100 02 457 describes a sliding roof system that employs two straight guide tracks extending roughly in the longitudinal direction of a vehicle along the roof. The distance between the guide tracks decreases from front to back. To guide the cover in the tracks, two guide elements are provided, each of which is contained in one of the guide tracks and connected to the cover by a parallelogram guide. This makes it possible for the distance between the two guide elements to change as the distance between the guide tracks changes.

In theory, the two parallelogram guides would also prevent the cover from twisting about its vertical axis or from being laterally displaced. In practice, however, the cover is prevented from twisting and displacement due to the guide elements precisely guided in the guide tracks and due to the cover being prevented from tilting. In other words, every force acting upon the cover to displace it laterally or to twist it about its vertical axis leads, as a result of the parallelogram guides, to rotational forces being applied to the two guide elements in the guide tracks. As a result, the entire sliding roof system is relatively hard to move and tends to jam. In addition, the parallelogram guide is only suitable for straight-line guide tracks that lie parallel to each other, not guide tracks whose distance from each other varies along the length of the track.

There is a desire to refine a sliding roof system to support the cover in a centered position relative to the guide tracks without risking the possibility that the guide elements may jam in the guide tracks or that the entire system may be subjected to undue strain.

SUMMARY OF THE INVENTION

One embodiment of the invention is directed to a cover for a sliding roof system having at least two guide elements that are movably arranged on two opposite sides of the cover so that the distance between them is variable. The two guide elements are each attached in a sliding guide, which predefines a displacement direction for the guide elements that differs from the displacement direction of the cover such that the cover is centered with regard to the two guide elements. The sliding guide in the invention greatly reduces the risk that the components will tilt relative to each other, thus assuring ease of motion in the system.

According to one embodiment of the present invention, each guide element is connected in an articulated fashion to a guide bar, which is received in the sliding guide. The articulated joint between the guide bar, which is movably guided on the cover, and the guide element ensures that no torque can be transmitted from the cover to the guide element, preventing the guide element from being jammed in the guide track in which it is contained. The articulated joints attaching the guide elements also makes it possible to use curved guide tracks while preserving smooth sliding performance.

According to one embodiment of the present invention, each guide bar is connected in an articulated fashion to a lever, and a coupling lever is supported on the cover so that it is able to swivel about a swivel axis. The levers are both connected in an articulated fashion to the coupling lever on each side of the swivel axis. In this manner, the cover can reliably be centered with respect to the two guide elements with minimal production expense.

According to another embodiment of the present invention, each guide bar is connected to a toothed rack that may be designed as an integral part of the guide bar. A gear wheel is rotatably supported on the cover with both toothed racks meshing in the gear wheel. This embodiment employs constrained guidance of the cover to ensuring centering of the cover with respect to the two guide bars with minimal production expense.

According to a further embodiment of the present invention, a second, supplemental pair of guide elements is provided with guide bars, each of which is supported on the cover in a sliding guide. The displacement direction of the first pair of guide elements is in a mirror-symmetrical fashion and obliquely oriented with respect to the displacement direction of the cover, and the displacement direction of the second pair of guide elements is perpendicular to the displacement direction of the cover. In this embodiment, no coupling between the guide bars of the guide elements is necessary because the spatial orientation of the displacement direction of the guide elements alone assures that the cover will remain centered between the two guide tracks in which the guide elements are movably contained.

The above-mentioned object of the present invention is also achieved by a sliding roof system having two guide tracks that extend along the roof of a motor vehicle at a changing distance and a cover as described above. Regarding the advantages of a sliding roof system of this type, reference is made to the above explanations.

BRIEF DESCRIPTION OF THE DRAWINGS

The present invention is described below on the basis of various embodiments, which are depicted in the attached drawings in which FIG. 1 depicts a schematic top view of a sliding roof system according to the invention in accordance with a first embodiment;

FIG. 2 depicts a schematic top view of a sliding roof system according to the invention in accordance with a second embodiment;

FIG. 5 depicts a schematic top view of a sliding roof system according to the invention wherein the guide tracks are substantially straight.

DETAILED DESCRIPTION OF THE EMBODIMENTS

Figure 3:
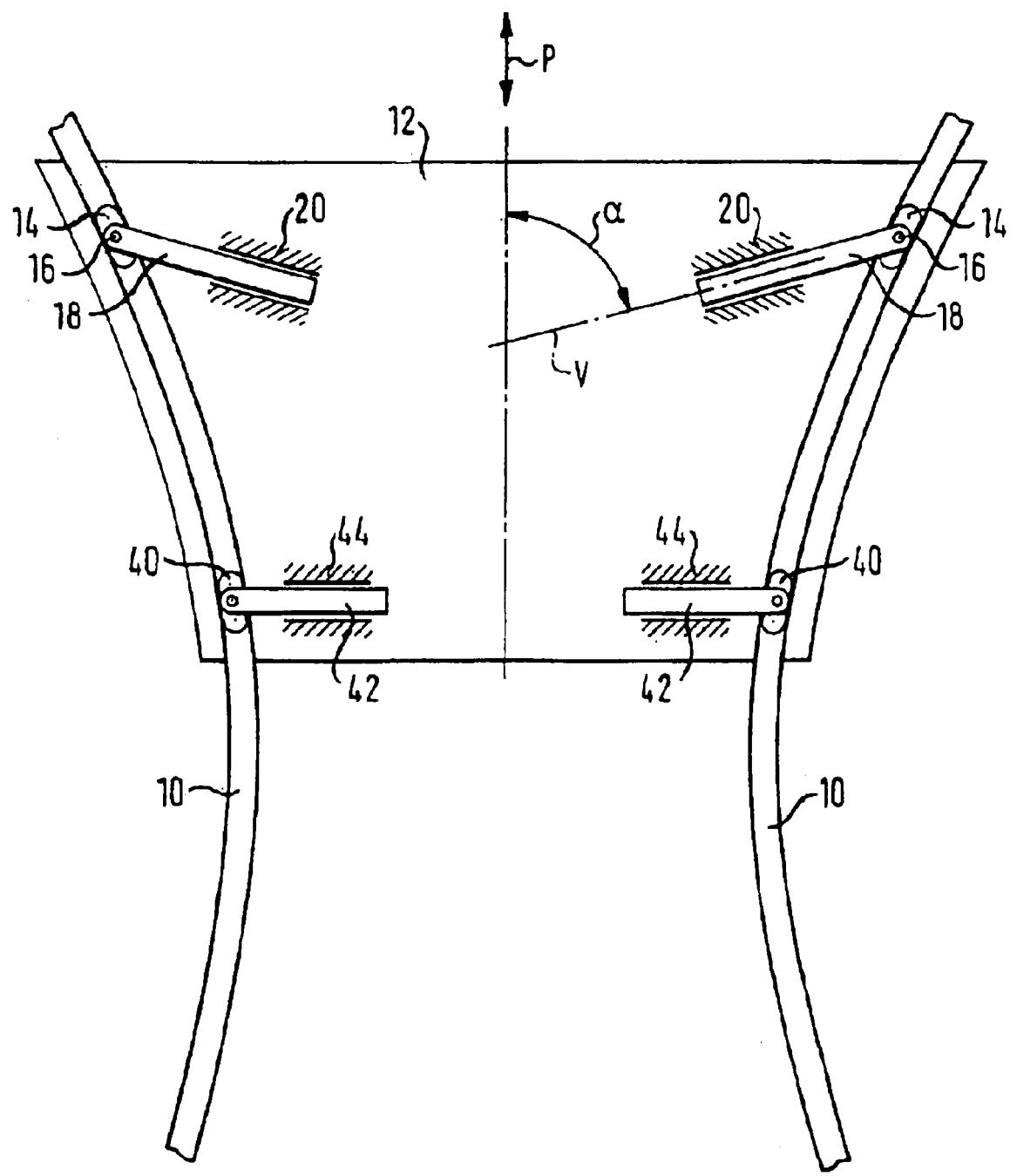
FIG. 3 depicts a schematic top view of a sliding roof system according to the invention in accordance with a third embodiment.

FIG. 1 illustrates a sliding roof system having two guide tracks 10 and a cover 12. Both guide tracks 10 extend roughly in the longitudinal direction of a vehicle roof (not shown). In the illustrated embodiment, both guide tracks 10 are designed to be curved in two planes, specifically about one axis parallel to a vertical axis of the vehicle and about another axis that is parallel to a transverse axis of the vehicle. In this manner, both guide tracks 10 can follow the shape of the side edges of the vehicle roof, particularly because modern vehicle roofs are usually curved and have a width that changes from front to back. Accordingly, the distance of the guide tracks from each other may also change as a function of the position that is being observed along the vehicle's longitudinal axis.

The cover 12 is displaceable in the guide tracks in a basically familiar manner. The cover position can be changed from a closed position, in which the cover 12 closes an opening in the roof of the vehicle, into an open position, in which the opening in the roof is exposed, by a drive mechanism (not shown). For the present invention, no emphasis is placed on the details of the displacement mechanism for the cover 12 or on the materials used for the cover 12; the present invention encompasses covers made of any material and having any position (e.g., covers made of metal, plastic, transparent material, etc.; covers that are moved outside the roof, covers that are moved inside the roof, etc.).

A guide element 14 is arranged in each guide track 10. In the illustrated embodiment, the guide element 14 is designed as a slider. The drive mechanism (not shown) for the cover 12 engages the guide elements 14. A guide bar 18 is mounted on each guide element 14 via an articulated joint 16, which in each case is movably contained in a sliding guide 20. Each sliding guide 20 is fixedly attached to the cover 12. A lever 24 is attached at the end of each guide bar 18 that is facing away from guide element 14 via another articulated joint 22. The lever 24 is also connected to one end of a coupling lever 28 via a further articulated joint 26. The coupling lever 28 is rotatably supported on the cover 12 by a swivel axle 30 that is arranged centrally between both articulated joints 26.

By rotating the coupling lever 28, about a swivel axis of the swivel axle 30, the distance of the guide elements 14 from each other can be varied via the levers 24 and the guide bars 18 and can therefore be adjusted to adapt to the specific distance between guide tracks 10 at any given point. Because the coupling lever 28 is fixedly mounted on the cover 12 via the swivel axle 30, the cover 12 is centered between both guide elements 14. Due to the displacement direction predefined by both sliding guides 20, which is perpendicular to the displacement direction P of the cover 12, the mechanism for moving the guide elements 14 cannot jam. This eliminates the need for an additional guide. However, a second guide having guide elements, guide bars, sliding guide, and coupling lever may be provided, if desired, to guide the cover in an even more stable fashion.

FIG. 2 illustrates another embodiment of the inventive sliding roof system. For the components that are common with the first embodiment, the same reference numerals are used, and in this respect reference is made to the above explanations.

In the second embodiment, the guide bars 18 are each equipped with a toothed rack 32, which is designed as an integral part of the guide bars 18 in the illustrated embodiment. Alternatively, the toothed racks 32 may be separate components attached to their respective guide bars 18 via any known mechanism. A gear wheel 34 is rotatably mounted on a swivel axle 30 and attached to the cover 12. The toothed racks 32 are disposed so that the sides opposite each other mesh in the gear wheel 34.

A coupling mechanism configured in this manner makes it possible to adjust the distance of guide elements 14 from each other while at the same time keeping the cover 12 centered by about the swivel axis of the swivel axle 30 with respect to the guide elements 14.

FIG. 3 illustrates a third embodiment of the invention. For the components that are the same as the preceding embodiments, the same reference numerals are used, and reference is made to the above explanations.

In this embodiment, the guide bars 18 of the guide elements 14 are not coupled to each other at all. Instead, the guide bars 18 can be moved freely in the sliding guides 20 attached to the cover 12. Additionally, the displacement direction V of the guide bars 18, which is predefined by the sliding guides 20, is oriented to be oblique with regard to the displacement direction P (i.e., at an angle α that is not 90°). The angle α in this example is identical for both guide bars 18; the guide bars are therefore mirror symmetrical with regard to a central axis of cover 12 that runs parallel to the displacement direction P. Alternatively, the angle α may be different for different guide bars 18, if desired.

In addition to the first pair of sliding guides and guide elements, a second, supplemental pair of guide elements 40 is provided, which are mounted on a second, supplemental pair of guide bars 42 in an articulated fashion, the guide bars in turn being movably contained in supplemental sliding guides 44, which are fixedly mounted on the cover 12. Both of the supplemental sliding guides 44 define a displacement direction for both of the supplemental guide bars 42 that is perpendicular to displacement direction P of the cover 12 and therefore also perpendicular to the central axis of the cover 12.

Due to the different orientations of the sliding guides 20 and the supplemental sliding guides 44, this embodiment ensures that the cover 12 is centered between the guide elements 14 and also between the second pair of guide elements 40. In addition, because all of the guide elements 14, 40 are attached by articulated joints to the guide bars 18, 42 and because the sliding guides 20 furnish a friction-free guide for the guide bars 18, 42, the cover 12 is reliably prevented from being tilted relative to the guide tracks 10, thus assuring ease of action of the sliding roof system.

Figure 4:
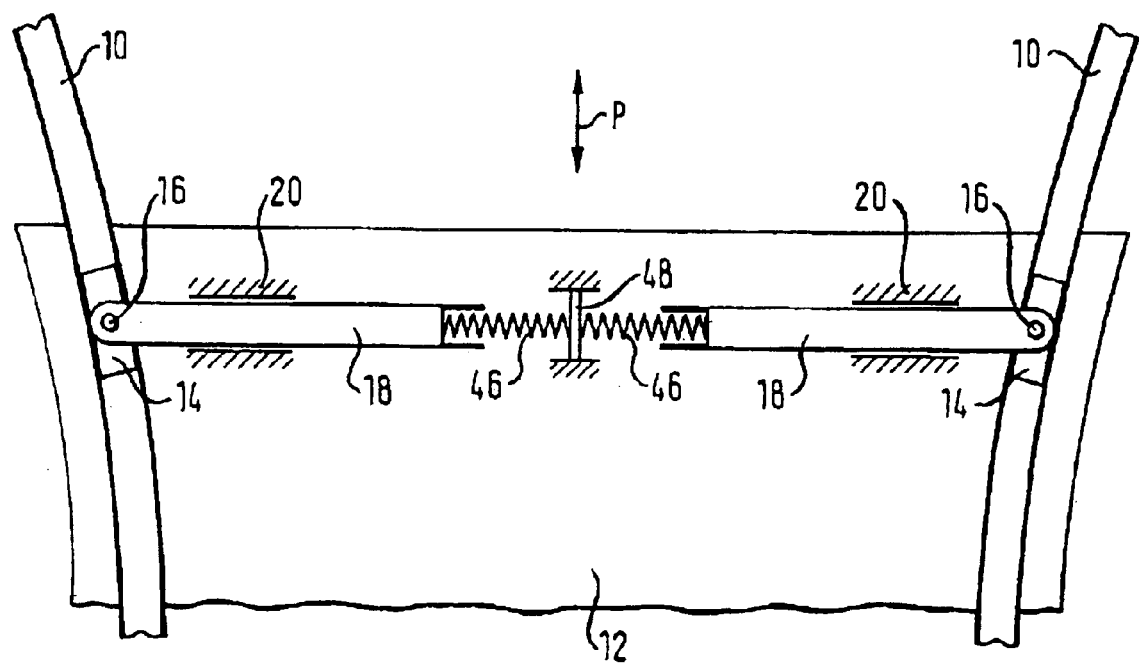
FIG. 4 depicts a schematic top view of a sliding roof system according to the invention in accordance with a fourth embodiment.

FIG. 4 illustrates a fourth embodiment of the invention. Here, too, for the components that are the same as in the preceding embodiments, the same reference numerals are used, and reference is also made to the above explanations.

In this embodiment, two sliding guides 20 are disposed perpendicular to the displacement direction P of the cover. Each guide bar 18 arranged in the sliding guides 20 is supported by a resilient member, such as a spring 46, on a limit stop 48. The resilient member 46 is mounted in the center of the cover 12. In this way, the cover 12 is centered in the middle between the two guide tracks 10.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. An apparatus for a vehicle roof, comprising:
   a cover;
   at least two guide elements that are movably arranged on opposite sides of the cover such that the distance between said at least two guide elements is variable;
   at least two sliding guides fixed to the cover, wherein said at least two sliding guides predefine guide element displacement directions that are different from a cover displacement direction; and at least two guide bars, each guide bar attached to one of said at least two guide elements and received in one of said at least two sliding guides.

2. The apparatus of claim 1, wherein the guide element displacement directions of said at least two sliding guides are substantially mirror-symmetrical.

3. The apparatus of claim 1, wherein each guide element is connected to its corresponding guide bar by an articulated joint.

4. The apparatus of claim 1, further comprising:

at least two levers, each lever connected to one of said at least two guide bars; and a coupling lever supported on the cover and swivelable about a swivel axis, wherein said at least two levers are connected to the coupling lever on opposite sides of the swivel axis.

5. The apparatus of claim 4, wherein articulated joints connect said at least two guide bars to said at least two levers and connect said at least two levers to the coupling lever.

6. The apparatus of claim 1, further comprising:

at least two toothed racks, each toothed rack disposed on one of said at least two guide bars; and a gear wheel rotatably supported on the cover, wherein said at least two toothed racks mesh in the gear wheel.

7. The apparatus of claim 6, wherein each toothed rack is integrated with its corresponding guide bar.

8. The apparatus of claim 1, further comprising:

at least two supplemental sliding guides fixed to the cover, wherein said at least two supplemental sliding guides predefine second guide element displacement directions;

at least two supplemental guide elements; and at least two supplemental guide bars, each supplemental guide bar attached to one of said at least two supplemental guide elements and received in one of said at least two supplemental sliding guides.

9. The apparatus of claim 8, wherein the guide element displacement directions of said at least two sliding guides are substantially mirror-symmetrical and obliquely oriented with respect to the cover displacement direction, and wherein the second displacement directions of said at least two supplemental guide elements are generally perpendicular to the cover displacement direction.

10. The apparatus of claim 1, further comprising at least one resilient member mounted on the cover on a limit stop, wherein the at least one resilient member supports one of said at least two guide bars.

11. A sliding vehicle roof system, comprising:

two guide tracks extending along a vehicle roof, wherein a distance between the guide tracks varies along a length of the guide tracks;

a cover disposed between the guide tracks;

two guide elements that are movably arranged in the two guide tracks on opposite sides of the cover such that the distance between the two guide elements is variable as the distance between the guide tracks varies;

two sliding guides fixed to the cover, wherein the two sliding guides predefine substantially mirror-symmetrical guide element displacement directions that are different from a cover displacement direction; and two guide bars, each guide bar attached to one of the two guide elements and received in one of the two sliding guides.

12. The system of claim 11, wherein the guide tracks are substantially straight.

13. The system of claim 11, wherein the guide tracks are curved.

14. The system of claim 11 wherein each guide element is connected to its corresponding guide bar by an articulated joint.

15. The system of claim 11, further comprising:

two levers, each lever connected to one of said two guide bars; and a coupling lever supported on the cover and swivelable about a swivel axis, wherein the two levers are connected to the coupling lever on opposite sides of the swivel axis.

16. The system of claim 15, wherein articulated joints connect the two guide bars to the two levers and connect the two levers to the coupling lever.

17. The system of claim 11, further comprising:

two toothed racks, each toothed rack integrated with one of the two guide bars; and a gear wheel rotatably supported on the cover, wherein the two toothed racks mesh in the gear wheel.

18. The system of claim 11, further comprising:

two supplemental sliding guides fixed to the cover, wherein the two supplemental sliding guides predefine second guide element displacement directions;

two supplemental guide elements; and two supplemental guide bars, each supplemental guide bar attached to one of the two supplemental guide elements and received in one of the two supplemental sliding guides.

19. The system of claim 18, wherein the guide element displacement directions of the two sliding guides are substantially mirror-symmetrical and obliquely oriented with respect to the cover displacement direction, and wherein the second displacement directions of the two supplemental guide elements are generally perpendicular to the cover displacement direction.

20. The system of claim 11, further comprising at least one resilient member mounted on the cover on a limit stop, wherein the at least one resilient member supports one of said at least two guide bars.

* * * * *